United States Patent [19]

Laing

[11] Patent Number: 4,758,758
[45] Date of Patent: Jul. 19, 1988

[54] ROTOR FOR ELECTRIC MACHINES HAVING A SPHERICAL GAP FOR THE MAGNETIC FLUX

[76] Inventor: Karsten Laing, 632 Marsat Ct., Chula Vista, Calif. 92011

[21] Appl. No.: 905,830

[22] Filed: Sep. 10, 1986

Related U.S. Application Data

[63] Continuation-in-part of Ser. No. 667,778, Nov. 2, 1984, abandoned.

[51] Int. Cl.$^4$ .............................................. H02K 1/22
[52] U.S. Cl. .................................... 310/261; 310/42; 310/166; 310/197; 310/216; 29/598
[58] Field of Search ............... 310/166, 197, 104, 183, 310/211, 264, 42, 201, 261, 216, 217, 218; 29/598; 417/420; 336/211–213, 216–219, 233

[56] References Cited

U.S. PATENT DOCUMENTS

| | | | |
|---|---|---|---|
| 3,447,496 | 6/1969 | Laing | 310/166 |
| 4,043,706 | 8/1977 | Walker | 310/104 |
| 4,051,401 | 9/1977 | Hayward | 310/166 |
| 4,352,646 | 10/1982 | Laing et al. | 417/420 |
| 4,599,530 | 7/1986 | Laing | 310/166 |
| 4,620,120 | 10/1986 | Laing | 310/166 |

FOREIGN PATENT DOCUMENTS

| | | |
|---|---|---|
| 1788166 | 4/1976 | Fed. Rep. of Germany ...... 310/211 |
| 803395 | 10/1958 | United Kingdom . |
| 1134228 | 11/1968 | United Kingdom . |
| 1207621 | 7/1970 | United Kingdom . |
| 1287145 | 8/1972 | United Kingdom . |
| 1297240 | 11/1972 | United Kingdom . |

Primary Examiner—R. Skudy
Attorney, Agent, or Firm—Pennie & Edmonds

[57] ABSTRACT

A rotor for an electric motor with a spherical surface consists of a ring of soft iron and a squirrel cage made preferably from copper. The squirrel cage consists of copper bars lying in spiral grooves and a cooper ring on each axial end of the iron ring, short-circuiting all bars. The pole segments between the grooves do not have pole shoes. A cap made of ferro-magnetic metal covers the windings and acts magnetically in the same way as pole shoes. The cap surrounds the hollow spaces between the ring and the cap. The squirrel cage will preferably be cast by filling the spaces with molten copper during manufacture.

7 Claims, 3 Drawing Sheets

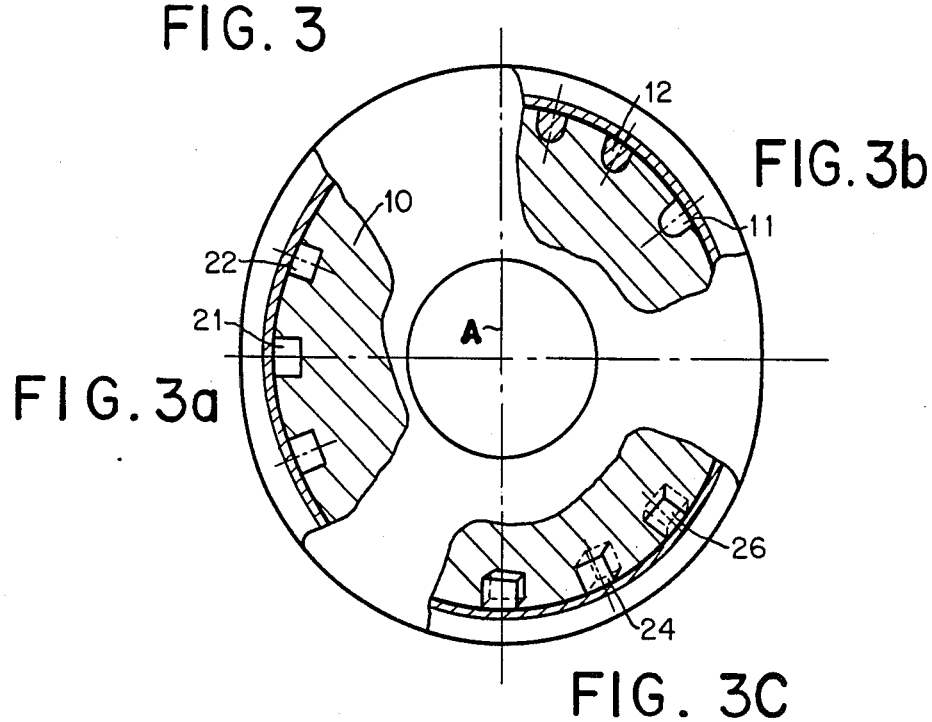
FIG. 3
FIG. 3a
FIG. 3b
FIG. 3C
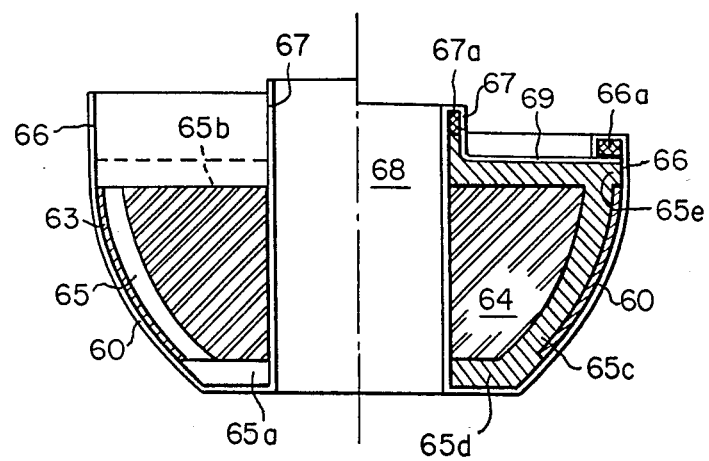
FIG. 5

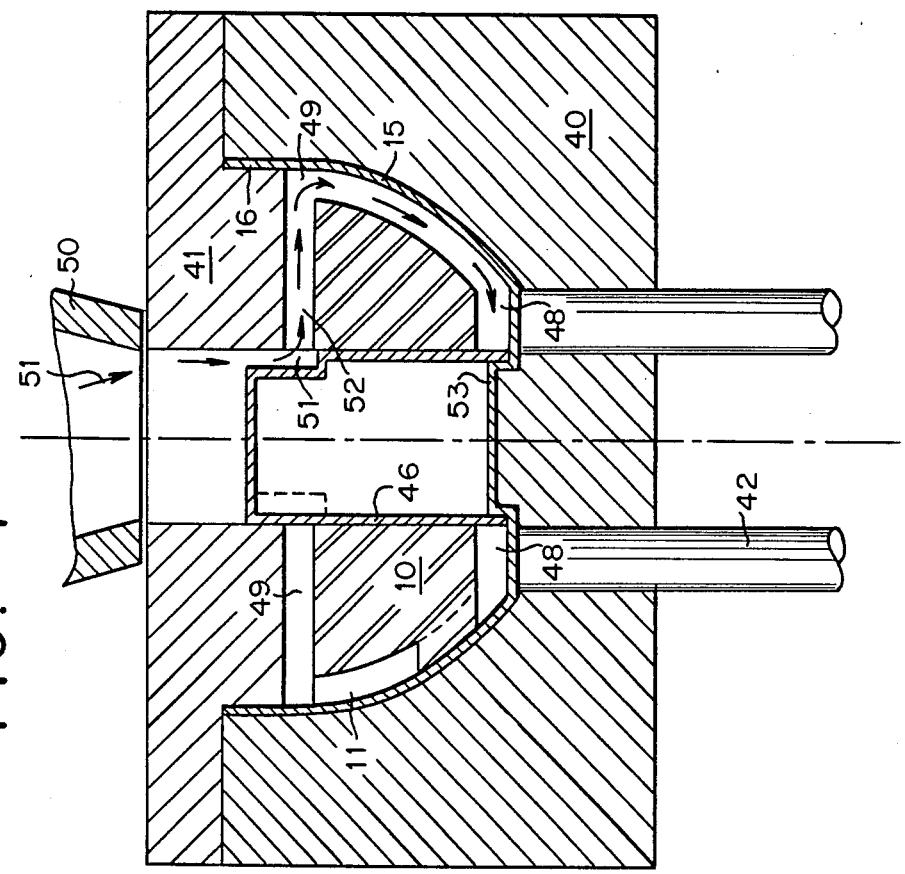

ROTOR FOR ELECTRIC MACHINES HAVING A SPHERICAL GAP FOR THE MAGNETIC FLUX

This application is continuation-in-part of the application Ser. No. 667,778, filed 11/02/84.

DESCRIPTION OF PRIOR ART

Electric motors, especially motor pump units with spherical magnetic gaps, are becoming increasingly important. Pumps of this kind are shown in U.S. Pat. Nos. 4,051,401, 4,043,706. The German Pat. No. 17 88 166 relates to a squirrel cage for the rotors of such pumps. U.S. Pat. No. 3,447,469 shows rotors for motor pump units with a spherical airgap. The rotors shown in said patent are either built from a one-piece iron ring or are comprised of iron segments. Rotors consisting of segments have the disadvantage that the magnetic flux is frequently interrupted. The rotors consisting of an iron ring, as shown in U.S. Pat. No. 4,051,401 FIG. 2b and 3b, have the disadvantage that the bars of the squirrel cage are arranged in grooves. This results in distances between juxtaposed poles 71 being as wide as the bars 73 of the squirrel cage. This causes strong magnetic noise and decreased electric efficiency. U.S. Pat. No. 3,447,469 describes in FIG. 3 a rotor that does not have this disadvantage because the rotor has no grooves. Said rotor is covered with a copper layer 31 which replaces the bars of the squirrel cage. This solution prevents magnetic noise but causes a significant increase in the width of the magnetic gap even if the deposited layer of copper 31 has a second magnetically conductive layer 34. This increase of the magnetic gap causes a significant loss in performance.

GENERAL DESCRIPTION OF THE INVENTION

The invention provides a solution in which the disadvantages no longer exist. In accordance with the invention, the iron ring forming the magnetically conductive part of the rotor has grooves which contain the bars of the squirrel cage. To replace pole shoes, the invention encases the iron part of the rotor and the squirrel cage with a ferro-magnetic cap. The wall of the cap is so thin that along the middle line between two juxtaposed poles, magnetic saturation is achieved. Therefore, in this area the magnetic conductivity is drastically reduced so that there is no magnetic short-circuiting between the poles. On the other hand, in the remaining areas sufficient magnetic conductivity remains so that the cap, even though it does not show any slots, acts as pole shoes do in conventional armatures.

Furthermore, the invention relates to a method to produce the squirrel cage from a highly conductive metal, such as copper.

DESCRIPTION OF THE DRAWINGS

FIG. 3 shows section along the lines of Section I—I in FIG. 1 and II—II in FIG. 2.

FIG. 3a shows the section I—I of FIG. 1.

FIG. 3b shows the section II—II of FIG. 2, depicting the sawtooth type grooves.

FIG. 3c shows the section II—II of FIG. 2, depicting the grooves cut at an angle.

FIG. 4 shows a rotor according to FIG. 1, inserted in a steel die.

FIG. 5 shows a rotor with a cap made from soft magnetic material and a shell case made from stainless steel to protect the armature against corrosive fluids.

DESCRIPTION OF THE PREFERRED EMBODIMENTS

Figure 1:
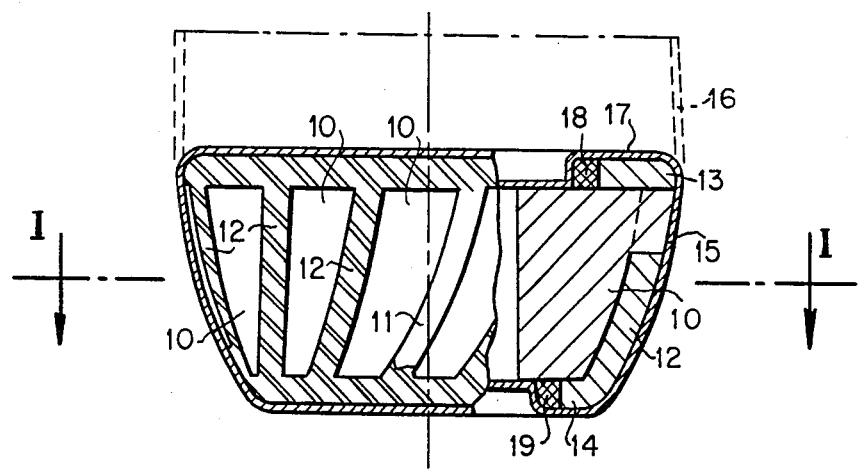
FIG. 1 shows a rotor sectioned on the right-hand side in an elevation and on the left-hand side a side view. The metal cap is only shown in cross-section around the entire rotor.

FIG. 1 illustrates a rotor consisting of a soft iron ring 10 of cast iron or sintering iron in which one of the grooves 11 can be seen in the center of the figure where the bar 12 is broken away. The grooves 11 run along helical spirals so that the ring can be screwed out of the die. Both the bars 12 in the grooves 11 and the short-circuiting annular rings 13 and 14 consist of copper. The right side of the figure shows a cross-section of the rotor. The entire rotor is enclosed in a cap 15 deep-drawn from a ferro-magnetic material, such as soft iron sheetmetal. After bending the rim portion 16 into position 17, the gaskets 18 and 19 are squeezed in to prevent any entrance of liquid.

Figure 2:
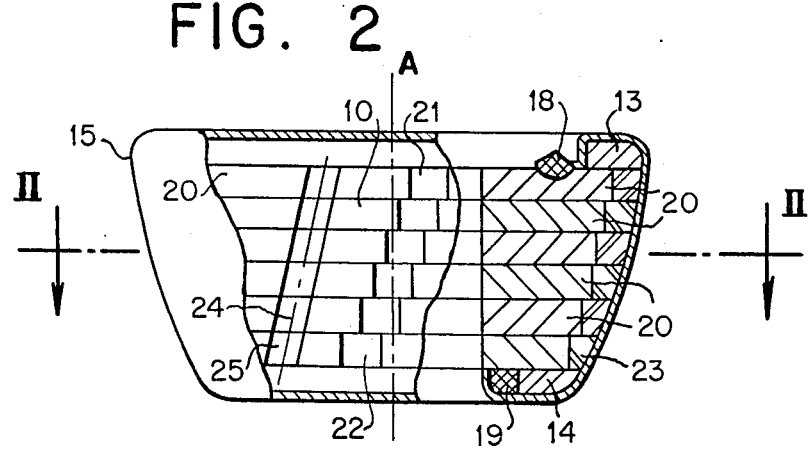
FIG. 2 shows the same rotor, but its iron ring consists of several stamped rings of thick sheetmetal laminations. Illustrated in FIG. 2 are two methods for forming grooves in the rotor.

FIG. 2 illustrates the construction of the rotor in which the iron ring 10 is formed by lamination of a plurality of rings 20 stamped of thick iron sheetmetal. The rings 20 are stamped out and show over their circumference a plurality of notches 21 which are also stamped out. The rings 20 are twisted at a small angle around the axis of rotation A so that the notches 21 form a groove along helical spiral 22. As can be seen in the drawing, the bars 23, which later on fill the notches, have sawtooth edges, reducing the conductivity of the bar 23. The invention therefor provides for a direction of stamping which runs parallel to the helical spiral line 24. This provides grooves 25 having straight edges. By this means the conductivity of a bar is considerably higher and the cross-section of the iron part of the circumference is not reduced unnecessarily.

FIG. 3a shows the cross-section of the notches 11 of FIG. 1 unfilled and filled with the copper bars 12. The copper fills the space between the walls of the notches 11 and the cap 15.

FIG. 3b shows notches 21 as shown in FIG. 2 along the helical spiral 22.

FIG. 3c illustrates notches 26 which are produced by a punch which is aligned at an angle to the axis A so that the walls of the notches 26 run parallel to the helical spiral line 24 in FIG. 2 and to the inner surface of the cap 15. The stacked notches 26 form grooves 25.

FIG. 4 shows a die 40 with cover ring 41, ejector 42 and inlet nozzle 50. The cap 15 with the bottom region 53 is inserted in the recess of the die. The iron ring 10 with the helical spiral grooves 11 is placed inside said cap 15. A cylindrical shell 46 prevents copper from flowing into the bore. The die 40 with the rotor, consisting of the cap 15 and ring 10, and the shell 46 is sealed by the cover ring 41 so that space remains for the spiral grooves 11, and spaces 48 and 49 remain for the smaller annular short-circuiting ring 14, and the upper short-circuiting annular ring 13. Thereafter, the nozzle 50 will be filled with a predetermined amount of liquid copper which flows in accordance with the arrows 51 and 52 into all open spaces forming the squirrel cage, adhering to the iron ring 10 and the cap 15. Now the cover ring 41 is taken off, and the ejectors 42 remove the rotor from the die. Thereafter the shell 46 will be removed, the bottom region 53 will be stamped out, the rim portion 16 of the cap 15 will be bent to the inside. Now the rotor is finished for balancing.

FIG. 5 shows the design of a rotor for pumps which convey corrosive liquids. The cross-section of the left side shows the rotor before the casting process. The rotor consists of the soft iron ring 64, the ferro-magnetic soft iron cap 63, and a non-magnetic outer shell 60 made from very thin corrosion resistant material (e.g. stainless steel). The grooves 65 and spaces 65a and 65b will be filled with copper and form the bars 65c and the annular rings 65d and 65e. The outer shell 60 has two overlapping rim portions 66 and 67. The right side of FIG. 5 shows the cross-section of the finished rotor after casting. An end plate 69 made from corrosion resistant material covers the larger ring portion 65e. The rim portion 67 is bent to the outside and squeezes the sealing gasket 67a. The rim portion 66 is bent to the inside and squeezes the gasket 66a. This design totally seals the iron and copper portion.

I claim:

1. A rotor for a spherical gap electrical motor comprising:
   (a) an iron ring having a spherical surface;
   (b) grooves in the spherical surface which extend over the axial length of the iron ring;
   (c) bars of highly electrically conductive material disposed in the grooves;
   (d) short-circuiting annular rings of highly electrically conductive material located on the top and bottom of the iron ring, integrally formed in one piece with the bars to form a squirrel cage; and
   (e) a thin-walled cap of ferro-magnetic material surrounding the iron ring and supporting molten material used to form the squirrel cage.

2. A rotor as in claim 1, characterized in that the iron ring consists of cast iron and that the grooves run along helical spirals.

3. A rotor as in claim 2, characterized in that the ferro-magnetic cap further surrounds the short-circuiting annular rings.

4. A rotor as in claim 3, characterized in that the short-circuiting annular rings and gaskets are between the ferro-magnetic cap and the iron ring.

5. A rotor as in claim 1 characterized in that the iron ring is formed from laminations of stamped-out rings each of which exhibits notches uniformly distributed over its circumference and the notches aligned to form grooves.

6. A rotor as in claim 5, characterized in that the sides of the notches are cut parallel to the helical spiral line.

7. A rotor as in claim 1, having in addition to the ferro-magnetic cap, a non-magnetic outer shell with a cover plate and a sealing gasket whereby a hermetically sealed enclosure is formed for the iron ring and the squirrel cage.

* * * * *